US009014761B2

(12) United States Patent
Lee et al.

(10) Patent No.: US 9,014,761 B2
(45) Date of Patent: Apr. 21, 2015

(54) MOBILE TERMINAL

(75) Inventors: Sangman Lee, Seoul (KR); Jina Park, Incheon (KR); Junghyeong Ha, Seoul (KR); Byungwoon Jung, Seoul (KR); Youngbae Kwon, Incheon (KR); Changwon Yun, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 211 days.

(21) Appl. No.: 13/529,618

(22) Filed: Jun. 21, 2012

(65) Prior Publication Data

US 2013/0017867 A1 Jan. 17, 2013

(30) Foreign Application Priority Data

Jul. 13, 2011 (KR) ........................ 10-2011-0069613
Jul. 13, 2011 (KR) ........................ 10-2011-0069614

(51) Int. Cl.
*H04B 1/38* (2006.01)
*H04M 1/00* (2006.01)
*H01Q 7/06* (2006.01)
*H01Q 1/24* (2006.01)

(52) U.S. Cl.
CPC . *H01Q 7/06* (2013.01); *H01Q 1/243* (2013.01)

(58) Field of Classification Search
CPC ........................................................ H01Q 7/08
USPC ................ 455/550.1, 562.1, 566, 570, 575.1, 455/575.5, 575.7
See application file for complete search history.

(56) References Cited

U.S. PATENT DOCUMENTS

| | | | | |
|---|---|---|---|---|
| 8,219,143 | B2 * | 7/2012 | Waku et al. | 455/552.1 |
| 2009/0002242 | A1 * | 1/2009 | Lasarov et al. | 343/702 |
| 2010/0093390 | A1 | 4/2010 | Waku et al. | |
| 2010/0099365 | A1 | 4/2010 | Aramaki et al. | |
| 2010/0315389 | A1 | 12/2010 | Sorrell | |

FOREIGN PATENT DOCUMENTS

| | | | |
|---|---|---|---|
| EP | 1 775 794 | A1 | 4/2007 |
| EP | 2 276 109 | A1 | 1/2011 |
| GB | 2 439 601 | A | 1/2008 |
| WO | WO 2009/014366 | A2 | 1/2009 |

OTHER PUBLICATIONS

European Search Report dated Nov. 22, 2012 for Application 12005112.3.

* cited by examiner

*Primary Examiner* — Tuan H Nguyen
(74) *Attorney, Agent, or Firm* — Ked & Associates, LLP

(57) ABSTRACT

A mobile terminal is provided that includes a main body in which a structure is mounted, an antenna coil formed to be wound along edges of the structure to receive a change in magnetic flux in a vicinity of the main body, an electronic element disposed to be adjacent to the structure, and a ferrite sheet configured to remove noise with respect to reception of the change in the magnetic flux and disposed on one surface of the electronic element such that a distance is formed between the ferrite sheet and the antenna coil.

16 Claims, 13 Drawing Sheets

MOBILE TERMINAL

CROSS-REFERENCE TO RELATED APPLICATIONS

This application claims priority from Korean Patent Application No. 10-2011-0069613, field Jul. 13, 2011 and Korean Patent Application No. 10-2011-0069614, filed Jul. 13, 2011, both the subject matters of which are hereby incorporated by reference.

BACKGROUND

1. Field

Embodiments may relate to a mobile terminal for near field communication.

2. Background

Terminals may be classified into a mobile terminal and stationary terminal according to whether or not the terminals are movable. Mobile terminals may be classified into a handheld terminal and a vehicle mount terminal according to whether or not users may directly carry the terminal.

Terminals may support more complicated functions such as capturing images or video, reproducing music or video files, playing games, receiving broadcast signals, and/or the like. By comprehensively and collectively implementing such functions, terminals may be embodied as a multimedia player or device.

In order to implement various functions of such multimedia players or devices, attempts may be made and implemented in terms of hardware and/or software. For example, a user interface may allow users to easily and conveniently search for and select one or more functions.

As users consider their mobile terminals as personal belongings to express their personality, mobile terminals may have various designs. The designs may include a structural change and enhancement allowing users to conveniently use mobile terminals.

BRIEF DESCRIPTION OF THE DRAWINGS

Arrangements and embodiments may be described in detail with reference to the following drawings in which like reference numerals refer to like elements and wherein.

DETAILED DESCRIPTION

A mobile terminal may now be described with reference to accompanying drawings. In the following description, usage of suffixes such as 'module', 'part' or 'unit' used for referring to elements may be provided merely to facilitate explanation of embodiments of the present invention, without having any significant meaning by itself.

The mobile terminal may include mobile phones, smart phones, notebook computers, digital broadcast receivers, PDAs (Personal Digital Assistants), PMPs (Portable Multimedia Player), navigation devices, and/or the like.

Figure 1:
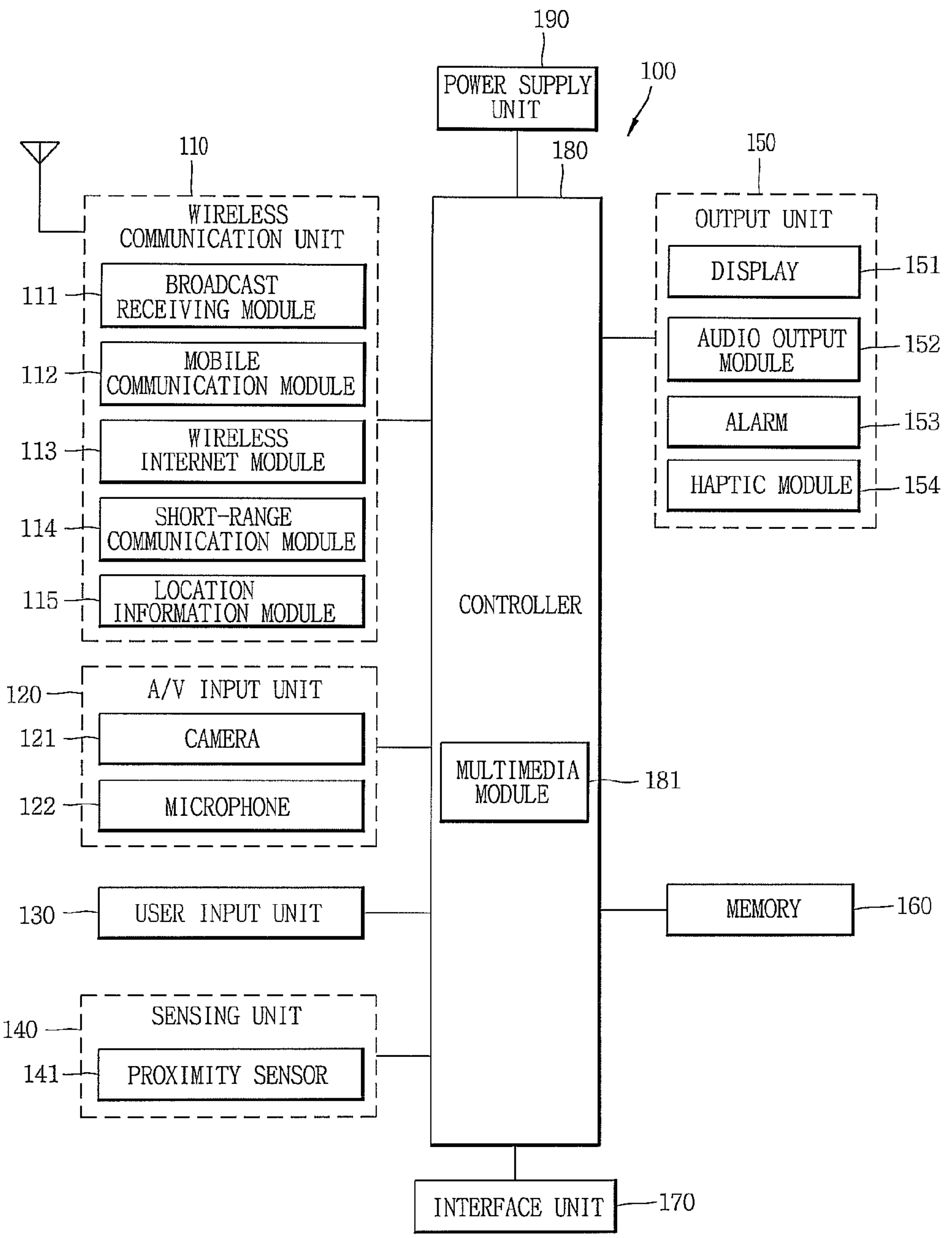
FIG. 1 is a schematic block diagram of a mobile terminal related to an embodiment of the present invention.

FIG. 1 is a block diagram of a mobile terminal according to an embodiment of the present invention. Other embodiments and configurations may also be provided.

FIG. 1 shows a mobile terminal 100 that may include a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 as having various components, although implementing all of the illustrated components is not a requirement. Greater or fewer components may alternatively be implemented.

Elements of the mobile terminal 100 may be described in detail as follows.

The wireless communication unit 110 may include one or more components allowing radio communication between the mobile terminal 100 and a wireless communication system or a network in which the mobile terminal 100 is located. For example, the wireless communication unit 100 may include at least one of a broadcast receiving module 111, a mobile communication module 112, a wireless Internet module 113, a short-range communication module 114, and a location information module 115.

The broadcast receiving module 111 may receive broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and/or the like. The broadcast signal may further include a broadcast signal combined with a TV or radio broadcast signal.

The broadcast associated information may refer to information associated with a broadcast channel, a broadcast program and/or a broadcast service provider. The broadcast associated information may also be provided via a mobile communication network, and the broadcast associated information may be received by the mobile communication module 112.

The broadcast associated information may exist in various forms. For example, the broadcast associated information may exist in the form of an electronic program guide (EPG) of digital multimedia broadcasting (DMB), an electronic service guide (ESG) of digital video broadcast-handheld (DVB-H), and/or the like.

The broadcast receiving module 111 may receive signals broadcast by using various types of broadcast systems. The broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be suitable for every broadcast system that provides a broadcast signal as well as the above-described digital broadcast systems.

Broadcast signals and/or broadcast-associated information received via the broadcast receiving module 111 may be stored in the memory 160.

The mobile communication module 112 may transmit and/or receive radio signals to and/or from at least one of a base station (e.g., access point, Node B, etc.), an external terminal (e.g., other user devices) and/or a server (or other network entities). Such radio signals may include a voice call signal, a video call signal and/or various types of data according to text and/or multimedia message transmission and/or reception.

The wireless Internet module 113 may support wireless Internet access for the mobile terminal 100. The wireless Internet module 113 may be internally or externally coupled to the mobile terminal 100. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), and/or the like.

The short-range communication module 114 may be a module for supporting short range communications. Examples of short-range communication technology may include Bluetooth™, Radio Frequency IDentification (RFID), Infrared Data Association (IrDA), Ultra-WideBand (UWB), ZigBee™, and/or the like.

The location information module 115 may be a module for checking, acquiring and/or determining a location (or position) of the mobile terminal 100. A GPS (Global Positioning System) is one example of the location information module 115.

The A/V input unit 120 may receive an audio or video signal. The A/V input unit 120 may include a camera 121 (or other image capture device) and a microphone 122 (or other sound pick-up device). The camera 121 may process image data of still pictures or video obtained by an image capture device in a video capturing mode or an image capturing mode. The processed image frames may be displayed on a display 151 (or other visual output device). The display 151 may also be considered a display module or display unit.

The image frames processed by the camera 121 may be stored in the memory 160 (or other storage medium) or may be transmitted via the wireless communication unit 110. Two or more cameras 121 may be provided according to the configuration of the mobile terminal 100.

The microphone 122 may receive sounds (audible data) via a microphone (or the like) in a phone call mode, a recording mode, a voice recognition mode, and/or the like, and the microphone 122 can process such sounds into audio data. The processed audio (voice) data may be converted for output into a format transmittable to a mobile communication base station (or other network entity) via the mobile communication module 112 in case of the phone call mode. The microphone 122 may implement various types of noise removing (or suppression) algorithms to remove (or suppress) noise or interference generated in the course of receiving and transmitting audio signals.

The user input unit 130 (or other user input device) may generate input data from commands entered by a user to control various operations of the mobile terminal 100. The user input unit 130 may include a keypad, a dome switch, a touch pad (e.g., a touch sensitive member that detects changes in resistance, pressure, capacitance, etc. due to being contacted), a jog wheel, a jog switch, and/or the like.

The sensing unit 140 (or other detection means) may detect a current status (or state) of the mobile terminal 100 such as an opened state or a closed state of the mobile terminal 100, a location of the mobile terminal 100, presence or absence of user contact with the mobile terminal 100 (i.e., touch inputs), orientation of the mobile terminal 100, an acceleration or deceleration movement and direction of the mobile terminal 100, etc., and the sensing unit 140 may generate commands or signals for controlling an operation of the mobile terminal 100. For example, when the mobile terminal 100 is implemented as a slide type mobile phone, the sensing unit 140 may sense whether the slide phone is opened or closed. Additionally, the sensing unit 140 may detect whether or not the power supply unit 190 supplies power or whether or not the interface unit 170 is coupled with an external device. The sensing unit 140 may include a proximity sensor 141.

The output unit 150 may provide outputs in a visual, audible, and/or tactile manner (e.g., audio signal, video signal, alarm signal, vibration signal, etc.). The output unit 150 may include the display 151, an audio output module 152, an alarm 153, a haptic module 154, and/or the like.

The display 151 may display (output) information processed in the mobile terminal 100. For example, when the mobile terminal 100 is in a phone call mode, the display 151 may display a User Interface (UI) or a Graphic User Interface (GUI) associated with a call or other communication (such as text messaging, multimedia file downloading, etc.). When the mobile terminal 100 is in a video call mode or an image capturing mode, the display 151 may display a captured image and/or a received image, a UI or a GUI that shows videos or images and functions related thereto, and the like.

The display 151 may include at least one of a Liquid Crystal Display (LCD), a Thin Film Transistor-LCD (TFT-LCD), an Organic Light Emitting Diode (OLED) display, a flexible display, a three-dimensional (3D) display, and/or the like.

The display 151 may be configured to be transparent or light-transmissive to allow viewing of an exterior, which may be called a transparent display. A transparent display may be a TOLED (Transparent Organic Light Emitting Diode) display, and/or the like, for example. Through such configuration, the user can view an object positioned at the rear side of the terminal body through a region occupied by the display 151 of the terminal body.

The mobile terminal 100 may include two or more display units (or other display means) according to a particular desired embodiment. For example, a plurality of displays (or display units) may be separately or integrally disposed on one surface of the mobile terminal 100, or the plurality of displays may be separately disposed on mutually different surfaces.

When the display 151 and a sensor (hereinafter referred to as a touch sensor) for detecting a touch operation are overlaid in a layered manner to form a touch screen, the display 151 may function as both an input device and an output device. The touch sensor may have a form of a touch film, a touch sheet, a touch pad, and/or the like.

The touch sensor may convert pressure applied to a particular portion of the display 151 or a change in capacitance or the like generated at a particular portion of the display 151 into an electrical input signal. The touch sensor may be configured to detect the pressure when a touch is applied, as well as the touched position and area.

When there is a touch input with respect to the touch sensor, a corresponding signal (signals) may be transmitted to a touch controller. The touch controller may process the signals and transmit corresponding data to the controller 180. Accordingly, the controller 180 may recognize which portion of the display 151 has been touched.

With reference to FIG. 1, a proximity sensor 141 may be disposed within or near the touch screen. The proximity sensor 141 may be a sensor for detecting presence or absence of an object relative to a certain detection surface or an object that exists nearby by using the force of electromagnetism or infrared rays without a physical contact. Thus, the proximity sensor 141 may have a considerably longer life span compared with a contact type sensor, and the proximity sensor 141 can be utilized for various purposes.

Examples of the proximity sensor 141 may include a transmission type photoelectric sensor, a direct reflection type photoelectric sensor, a mirror-reflection type photoelectric sensor, an RF oscillation type proximity sensor, a capacitance type proximity sensor, a magnetic proximity sensor, an infrared proximity sensor, and/or the like. In an example where the touch screen is the capacitance type, proximity of the pointer may be detected by a change in electric field according to proximity of the pointer. In this example, the touch screen (touch sensor) may be classified as a proximity sensor.

In the following description, for the sake of brevity, recognition of the pointer positioned to be close to the touch screen may be called a 'proximity touch', while recognition of actual contacting of the pointer on the touch screen may be called a 'contact touch'. In this example, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, and/or the like) may be detected, and information corresponding to the detected proximity touch operation and the proximity touch pattern may be outputted to the touch screen.

The audio output module 152 may convert and output (as sound audio) data received from the wireless communication unit 110 or stored in the memory 160 in a call signal reception mode, a call mode, a record mode, a voice recognition mode, a broadcast reception mode, and/or the like. The audio output module 152 may provide audible outputs related to a particular function performed by the mobile terminal 100 (e.g., a call signal reception sound, a message reception sound, etc.). The audio output module 152 may include a speaker, a buzzer, and/or other sound generating device.

The alarm 153 (or other type of user notification means) may provide outputs to inform about occurrence of an event of the mobile terminal 100. Events may include call reception, message reception, key signal inputs, a touch input etc. In addition to audio or video outputs, the alarm 153 may provide outputs in a different manner to inform about an occurrence of an event. For example, the alarm 153 may provide an output in the form of vibrations (or other tactile or sensible outputs). When a call, a message, and/or some other incoming communication is received, the alarm 153 may provide tactile outputs (i.e., vibrations) to inform the user thereof. By providing such tactile outputs, the user may recognize the occurrence of various events even if the mobile terminal is in the user's pocket. Outputs informing about the occurrence of an event may be also provided via the display 151 or the audio output module 152. The display 151 and the audio output module 152 may be classified as a part of the alarm 153.

The haptic module 154 may generate various tactile effects that the user may feel. Vibration may be one example of the tactile effects generated by the haptic module 154. A strength and a pattern of the haptic module 154 may be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or a suction force of air through a jet orifice or a suction opening, a contact on the skin, a contact of an electrode, electrostatic force, etc., an effect by reproducing a sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to configuration of the mobile terminal 100.

The memory 160 may store software programs used for processing and controlling operations performed by the controller 180, or the memory 160 may temporarily store data (e.g., a phonebook, messages, still images, video, etc.) that are inputted or outputted. The memory 160 may also store data regarding various patterns of vibrations and audio signals outputted when a touch is inputted to the touch screen.

The memory 160 may include at least one type of storage medium such as a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and/or an optical disk. The mobile terminal 100 may operate in relation to a web storage device that performs the storage function of the memory 160 over the Internet.

The interface unit 170 may serve as an interface with every external device connected with the mobile terminal 100. For example, the external devices may transmit data to an external device, receive and transmit power to each element of the mobile terminal 100, and/or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, and/or the like.

The identification module may be a chip that stores various information for authenticating an authority of using the mobile terminal 100 and may include a user identity module (UIM), a subscriber identity module (SIM) a universal subscriber identity module (USIM), and/or the like. The device having the identification module (hereinafter also referred to as an identifying device) may be in the form of a smart card. Accordingly, the identifying device may be connected to the mobile terminal 100 via a port.

When the mobile terminal 100 is connected with an external cradle, the interface unit 170 may serve as a passage to allow power from the cradle to be supplied therethrough to the mobile terminal 100, or the interface unit 170 may serve as a passage to allow various command signals inputted by the user from the cradle to be transferred to the mobile terminal 100 therethrough. Various command signals or power inputted from the cradle may operate as signals for recognizing that the mobile terminal 100 is properly mounted on the cradle.

The controller 180 may control general operations of the mobile terminal 100. For example, the controller 180 may perform controlling and processing associated with voice calls, data communications, video calls, and/or the like. The controller 180 may include a multimedia module 181 for reproducing multimedia data. The multimedia module 181 may be configured within the controller 180 or may be configured to be separated from the controller 180.

The controller 180 may perform a pattern recognition process to recognize a handwriting input or a picture drawing input performed on the touch screen as characters or images, respectively.

The power supply unit 190 may receive external power or internal power and may supply appropriate power required for operating respective elements and components under the control of the controller 180.

Various embodiments described herein may be implemented in a computer-readable or its similar medium using, for example, software, hardware, and/or any combination thereof.

For hardware implementation, embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electronic units designed to perform the functions described herein. Such embodiments may be implemented by the controller 180.

For software implementation, embodiments such as procedures or functions described herein may be implemented by separate software modules. Each software module may perform one or more functions or operations described herein. Software codes may be implemented by a software application written in any suitable programming language. The software codes may be stored in the memory 160 and may be executed by the controller 180.

Figure 2A:
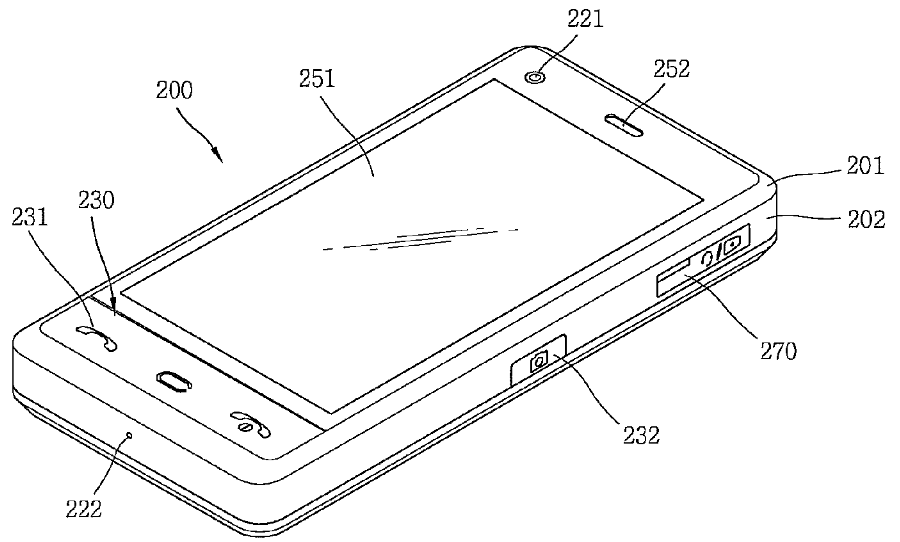
FIG. 2A is a front perspective view of the mobile terminal related to an embodiment of the present invention.
Figure 2B:
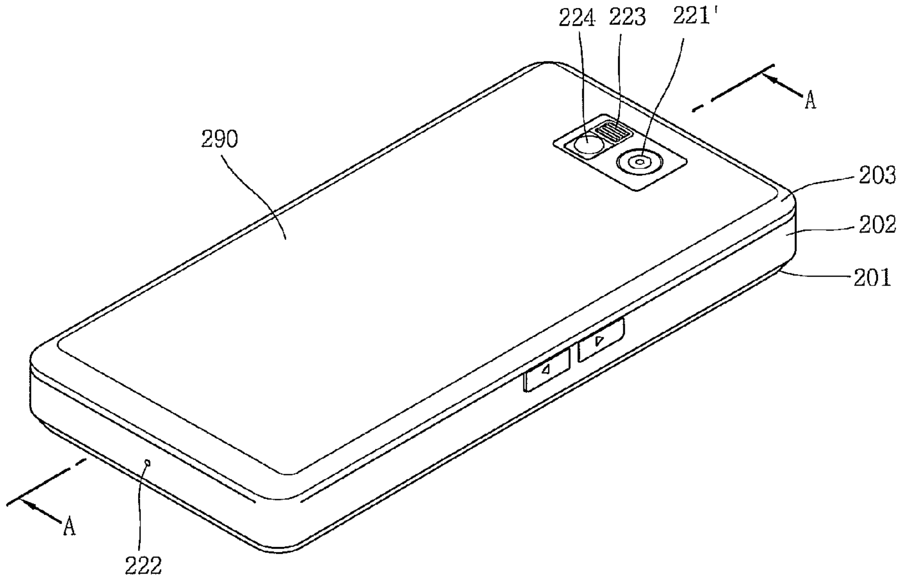
FIG. 2B is a rear perspective view of the mobile terminal of FIG. 2A.

FIG. 2A is a front perspective view of a mobile terminal according to an embodiment of the present invention. FIG. 2B is a rear perspective view of the mobile terminal of FIG. 2A. Other embodiments and configurations may also be provided. FIGS. 2A-2B, and the other figures, show elements of a mobile terminal 200. The mobile terminal 200 that may correspond to the mobile terminal 100 of FIG. 1.

The mobile terminal 200 may have a bar type terminal body. However, embodiments may also be applicable to a slide type mobile terminal, a folder type mobile terminal, a swing type mobile terminal, a swivel type mobile terminal and/or the like, including two or more bodies.

The terminal body may include a case (or casing, housing, cover, etc.) constituting an external appearance of the terminal body. The case may be separated (or divided) into a front case 201 and a rear case 202. Various electronic components may be installed in the space between the front case 201 and the rear case 202. One or more intermediate cases may be additionally disposed between the front case 201 and the rear case 202.

The cases may be formed by injection-molding a synthetic resin or may be made of a metallic material such as stainless steel (STS) or titanium (Ti), etc.

A display 251 (or display module), an audio output module 252, a camera 221, a user input unit 230 (231, 232), a microphone 222, an interface 270, and/or the like, and may be located on the terminal body (i.e., on the front case 201).

The display 251 may occupy most of the front surface of the front case 201. The audio output unit 251 and the camera 221 may be disposed at a region adjacent to one of both end portions of the display 251, and the user input unit 231 and the microphone 222 may be disposed at a region adjacent to another one of the both end portions. The user input unit 232, the interface 270 and/or the like may be disposed at sides of the front case 201 and the rear case 202.

The user input unit 230 may receive commands for controlling an operation of the mobile terminal 200. The user input unit 230 may include a plurality of manipulation units 231 and 232. The manipulation units 231 and 232 may be called a manipulating portion, and the manipulation units 231, 232 may employ a method so they can be manipulated in a tactile manner by the user.

Content inputted by the first and second manipulation units 231 and 232 may be variably set. For example, the first manipulation unit 231 may receive commands such as start, end, scroll and/or the like, and the second manipulation unit 232 may receive commands such as adjustment of size of a sound outputted from the audio output unit 252 or conversion to a touch recognition mode of the display 251. The display 251 may constitute a touch screen along with a touch sensor 240, and the touch screen may be an example of the user input unit 230.

As shown on FIG. 2B, a camera 221' may additionally be provided on a rear surface of the terminal body (i.e., on the rear case 202). The camera 221' (FIG. 2B) may have an image capture direction that is substantially opposite to an image capture direction of the camera 221 (FIG. 2A). The camera 221' may support a different number of pixels (i.e., have a different resolution) than the camera 221.

For example, the camera 221 may operate with a relatively lower resolution to capture an image(s) of the user's face and immediately transmit such image(s) to another party in real-time during video call communication or the like. The camera 221' may operate with a relatively higher resolution to capture images of general objects with a high picture quality, which may not require immediately transmission in real time. The cameras 221 and 221' may be installed on the terminal such that they are rotated or popped up.

A flash 223 and a mirror 224 may be additionally disposed adjacent to the camera 221'. When an image of the subject is captured with the camera 221', the flash 223 may illuminate the subject. The mirror 224 may allow the user to see himself when he wants to capture his own image (i.e., self-image capturing) by using the camera 221'.

An audio output unit may be additionally provided on the rear surface of the terminal body. The audio output unit may implement a stereoscopic function along with the audio output unit 252 (FIG. 2A), and/or may be used for implementing a speaker phone mode during call communication.

A power supply unit 290 for supplying power to the mobile terminal 200 may be mounted on the terminal body in order to supply power to the mobile terminal 200. The power supply unit 290 may be installed in the terminal body and/or may be directly detached from the outside of the terminal body.

A touch sensor 235 may be additionally provided (or mounted) on the rear case 202 to detect a touch. The touch sensor 235 may be light-transmissive in a similar manner as the display 251. In this example, when the display 251 is configured to output visual information from both sides, the visual information may be also recognized through the touch sensor 235. The information outputted from both sides may be controlled by the touch sensor 235. Alternatively, a display may be additionally provided (or mounted) on the touch sensor 235, so a touch screen may also be provided on the rear case 202.

The touch sensor 235 may operate in relation to the display 251 of the front case 201. The touch sensor 235 may be disposed to be parallel to the rear side of the display 251. The touch sensor 235 may have a size that is the same as or smaller than the display 251.

An antenna for a call may be mounted in the terminal main body, and a broadcast signal receiving antenna may also be provided on the terminal body.

An antenna device (FIG. 5) to implement near field communication may be provided on the terminal body. The antenna device 210 for near field communication may be described with reference to FIGS. 3 through 9.

Figure 3:
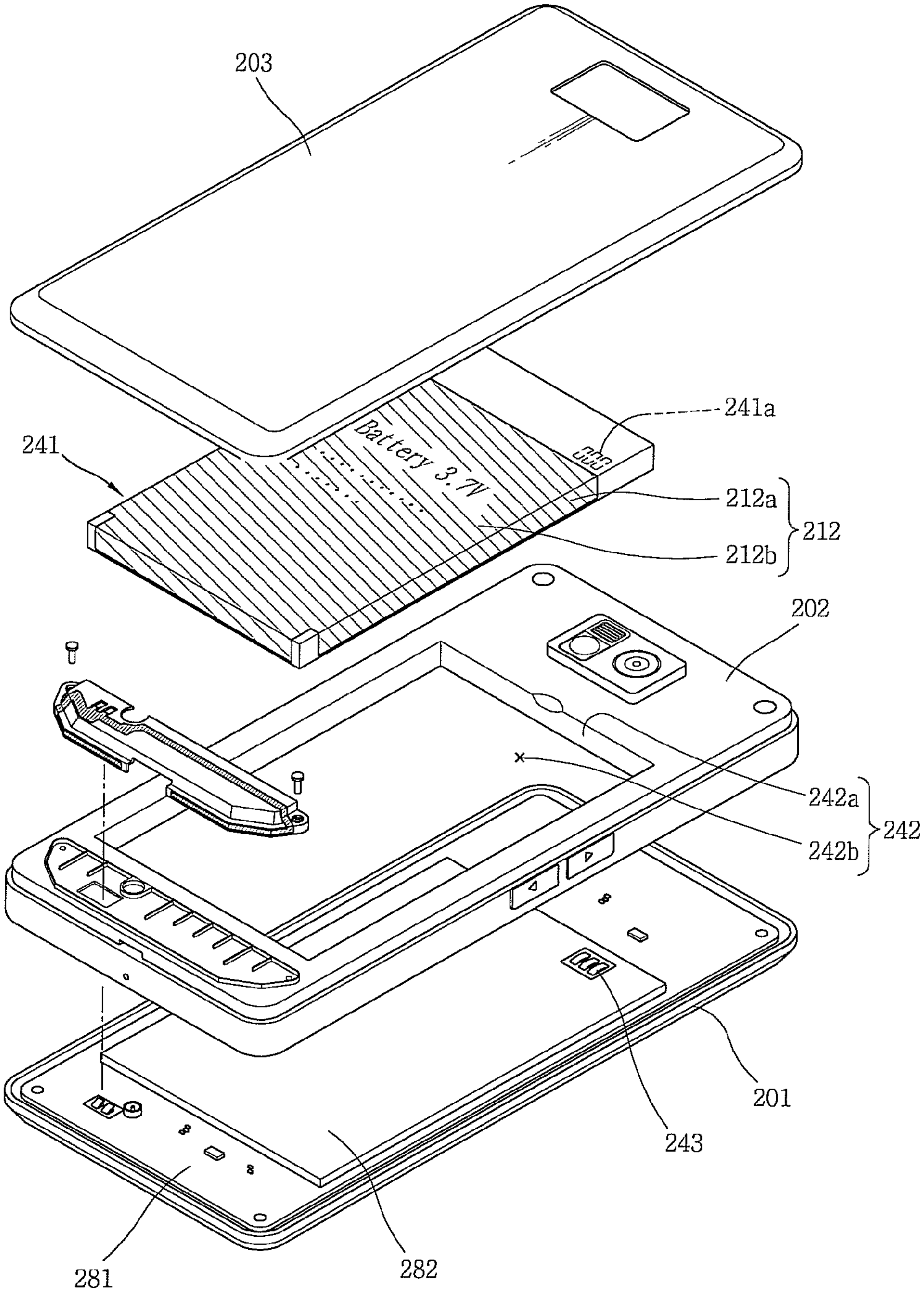
FIG. 3 is an exploded view of the mobile terminal of FIG. 2B.
Figure 4:
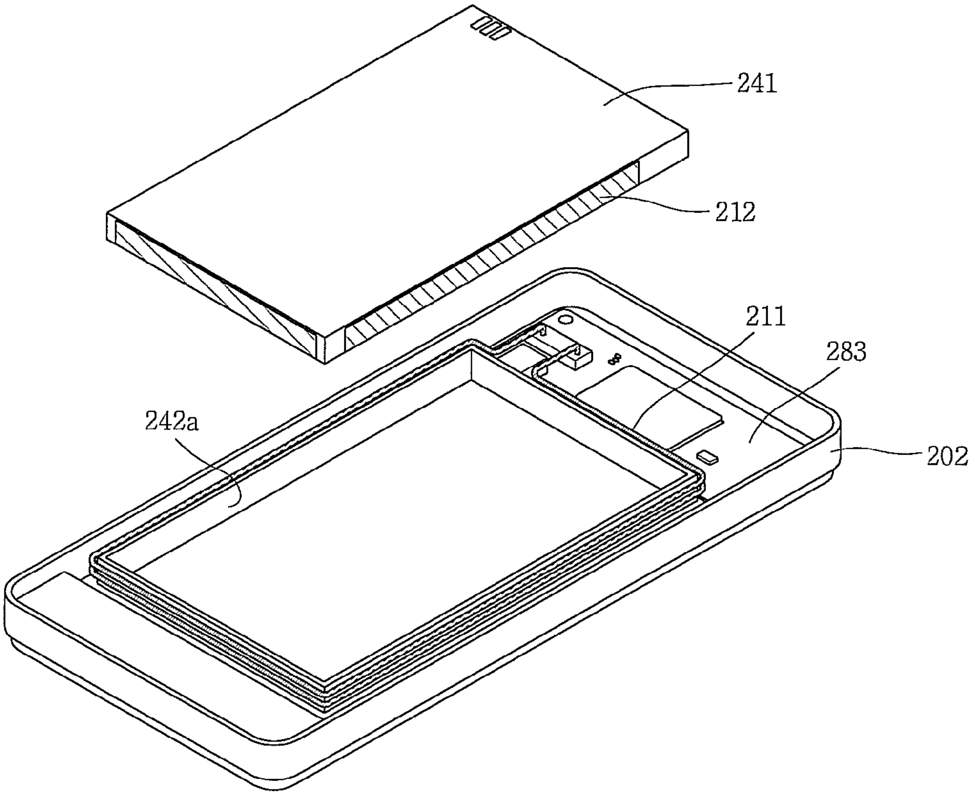
FIG. 4 is an exploded view of the mobile terminal of FIG. 2A.
Figure 5:
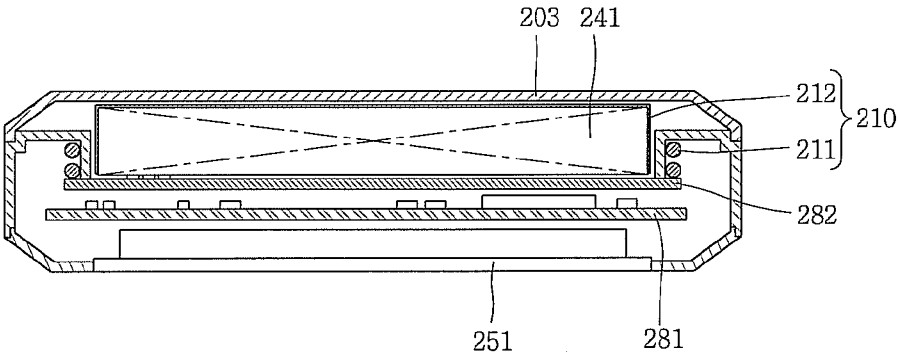
FIG. 5 is a sectional view taken along line A-A in FIG. 2B.

FIG. 3 is an exploded view of the mobile terminal of FIG. 2B. FIG. 4 is an exploded view of the mobile terminal of FIG. 2A. FIG. 5 is a sectional view taken along line A-A in FIG. 2B. Other embodiments and configurations may also be provided.

With reference to FIGS. 3 to 5, a circuit board 281 may be provided (or installed) in the terminal body. The circuit board 281 may be provided (or mounted) on the front case 201, the rear case 202, or the like, and/or the circuit board 281 may be provided (or mounted) on an internal structure. As shown, the circuit board 281 may be covered by an inner surface of the rear case 202.

Electronic elements may be provided (or mounted) on one surface of the circuit board 281. A shield member 282 may be provided (or mounted) on one surface of the circuit board 281 to protect the electronic elements. The shield member 282 may be formed of a metallic plate member, for example.

The circuit board 281 may be configured as an example of the controller 180 for operating various functions of the mobile terminal 100 (or the mobile terminal 200). A plurality of circuit boards 281 may be provided and/or combined to perform the function of the controller 180. A main antenna for transmitting and receiving a radio signal for a call may be provided (or mounted) at one end of the rear case 202. The main antenna may be electrically connected to the circuit board 281.

An accommodation portion 242 may be formed on or in the rear case 202 in order to accommodate the battery 241. The accommodation portion 242 may be provided in the form of a recess. The accommodation portion 242 may be considered a part of a body of the mobile terminal 200.

The accommodation portion 242 may include a side wall portion 242*a* and a bottom portion 242*b*. The side wall portion 242*a* may protrude in the form of a closed loop from one surface of a structure mounted on the terminal body to define an accommodation space of the accommodation portion 242. The structure may have a form of a frame, a case and/or a body. In this embodiment, the structure may be the rear case 202. The side wall portion 242*a* may protrude from the rear case 202.

The bottom portion 242*b* may be formed to cross the side wall portion 242*a* to allow the battery 241 to be provided thereon. The bottom of the accommodation portion 242 may be formed in a penetrative manner, through which the shield member 282 of the circuit board 281 may be exposed. According to this structure, the shield member 282 may form the bottom portion 242*b* of the accommodation portion 242. The battery 241 and the accommodation portion 242 may be configured as an example of the power supply unit 290 (FIG. 2B).

As shown, a coupling terminal 243 that is electrically coupled to a connection terminal 241*a* of the battery 241 may be provided on the accommodation portion 242. When the battery 241 is provided on the bottom portion 242*b*, the connection terminal 241*a* and the coupling terminal 243 are brought into contact, and power may be supplied to an electronic element of the mobile terminal 200.

In order to cover the battery 241 and the accommodation portion 242, a battery cover 203 may be provided (or mounted) on the rear case 202. The battery cover 203 may be provided as a case that forms an external appearance of the terminal body. The battery cover 203 may be configured to cover an entire rear surface of the mobile terminal 200.

The antenna device 210 (FIG. 5) may be installed (or provided) within the mobile terminal to perform near field communication. The circuit board 281 may be electrically connected to the antenna device 210, and the circuit board 281 may process a radio signal transmitted and received by the antenna device 210.

The antenna device 210 may include an antenna coil 211 and a ferrite sheet 212.

As shown in FIGS. 4 and 5, the antenna coil 211 may be wound around edges of the accommodation portion 242 to receive a change in magnetic flux in a vicinity of the terminal body. The antenna coil 211 in the form of a wire may be wound around the accommodation portion 242, for example. However, embodiments are not limited thereto. For example, the antenna coil 211 may be patterned on a surface of the accommodation portion 242 through plating, deposition, and/or the like.

The antenna coil 211 may be a portion of an electromagnetic induction type communication system that reads information upon transmitting and receiving magnetic flux to and from an antenna of a reader that forms an antenna of a radio-frequency identification (RFID) tag. However, embodiments are not limited thereto. For example, the antenna coil 211 may transmit and receive a radio signal to and from an antenna coil of a different terminal.

An integrated circuit (IC) of the RFID tag may be provided on the circuit board 281. In order to electrically connect the integrated circuit and the antenna coil 211, the antenna coil 211 may extend to an auxiliary circuit board 283, and the auxiliary circuit board 283 may be electrically connected to the circuit board 281. A rear camera may also be provided (or mounted) on the auxiliary circuit board 283.

The antenna device 210 may be a passive type antenna device, a semi-passive type antenna device, and/or an active type antenna device according to power using RFID. In an example of the passive type antenna device, the mobile terminal may read information of the IC by using a change in magnetic flux at the reader, as energy. In the semi-passive type antenna device, power of the battery 241 may be used to read information of the IC. In the active type antenna device, power of the battery 241 may be used to read information of the IC and transmit and receive the information.

As shown in FIGS. 3 and 5, a change in the magnetic flux generated when the antenna coil 211 comes close to the reader may be interfered by a conductor installed in the terminal body. The conductor may be a battery, a speaker, a camera, a vibration motor, and/or the like, for example.

The ferrite sheet 212 may restrain interference to the change in magnetic flux generated by the conductor. The ferrite sheet 212 may remove noise with respect to reception of the change in magnetic flux. The ferrite sheet 212 may be provided (or disposed) on the battery 241 such that a distance is formed between the ferrite sheet 212 and the antenna coil 211.

The ferrite sheet 212 may have a structure in which various metal compounds (assuming magnetism) have a form of paper that may be attached to the surface of the battery 241. The ferrite sheet 212 may be spaced apart from the antenna coil 211, and/or the ferrite sheet 212 may be disposed at a position adjacent to the antenna coil 211 so the antenna device 210 may be configured such that the ferrite sheet 212 and the antenna coil 211 are separated.

The antenna coil 211 may be wound around the structure (i.e., case, frame or the like) of the mobile terminal 200, and the ferrite sheet 212 may be attached to an electronic element (i.e., battery or the like) adjacent thereto, so the ferrite sheet 212 and the antenna coil 211 may be separately disposed.

The battery 241 may include a front surface, a rear surface, and a side surface. The ferrite sheet 212 may include a first ferrite sheet 212*a* provided (or mounted) on a side surface of the battery 241 to face the side wall portion 242*a* (of the accommodation portion 242). The first ferrite sheet 212*a* may cover respective side surfaces corresponding to four sides of the battery 241.

The antenna coil 211 may be wound around an outer circumferential surface of the side wall portion 242*a* such that a distance between the ferrite sheet 212*a* and the antenna coil 211 may be formed by a thickness of the side wall portion 242*a*. A strong magnetic field may be uniformly generated by the first ferrite sheet 212*a* that faces the antenna coil 211 in a width direction of the mobile terminal, and an effect of lengthening a communication distance to the reader may be obtained according to experimentation.

The ferrite sheet 212 may include a second ferrite sheet 212*b* provided (or mounted) on at least one of a front surface and/or a rear surface of the battery 241.

The second ferrite sheet 212*b* may face a same direction as that of the rear surface of the terminal body in a state in which the connection terminal 241*a* (of the battery 241) and the coupling terminal 243 (of the accommodation portion 242) are electrically connected. The second ferrite sheet 212*b* may be provided on a surface that faces the outside when the battery 241 is accommodated in the accommodation portion 242.

The second ferrite sheet 212*b* may form a label of the battery 241. For example, a label that includes various types of information of the battery 241 written thereon may be attached on a surface that faces the outside, and the label may be the second ferrite sheet 212*b*. The first and second ferrite sheets 212*a* and 212*b* may be integrally formed. For example, the ferrite sheet 212 may be implemented by mounting a single sheet on the battery 241.

Features described in the present embodiment may maximize area and space of the ferrite sheet 212 to re-form a magnetic field such that the magnetic field is strong and uniformly distributed.

Figure 6:
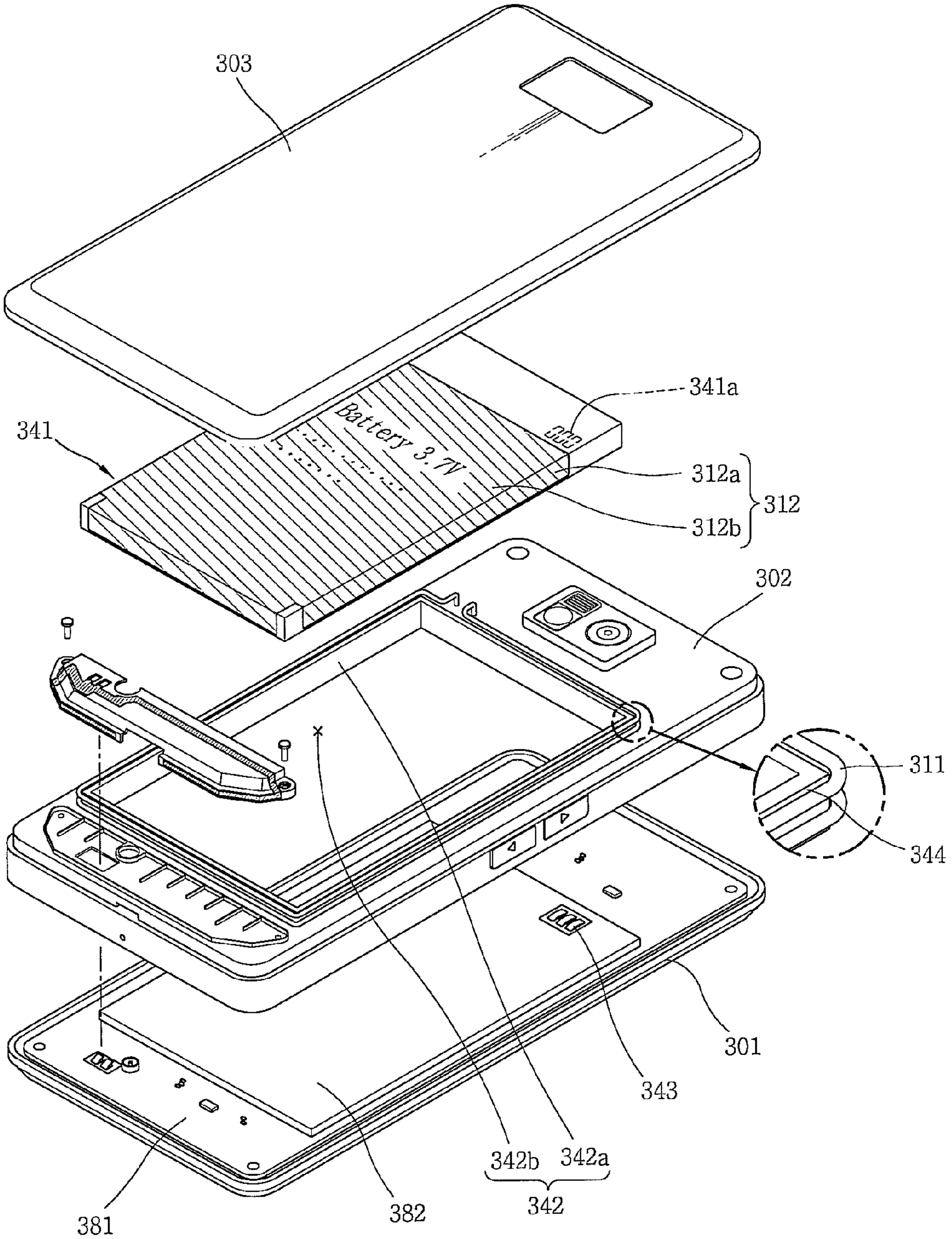
FIGS. 6 to 8 are views showing variants of a battery accommodation portion according to an embodiment of the present invention.
Figure 7:
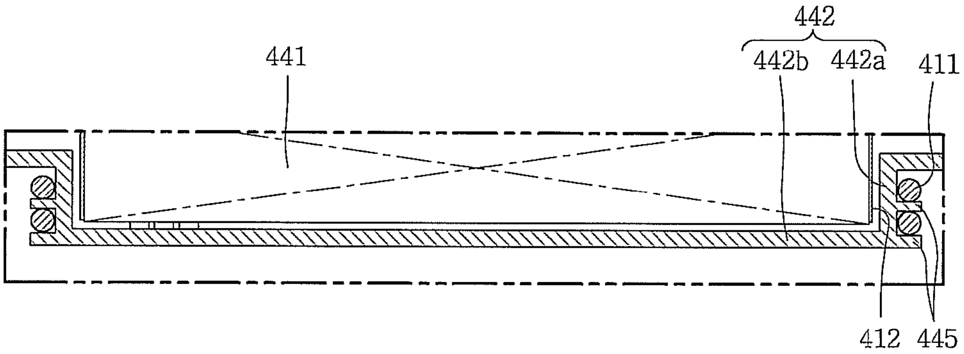
Figure 8:
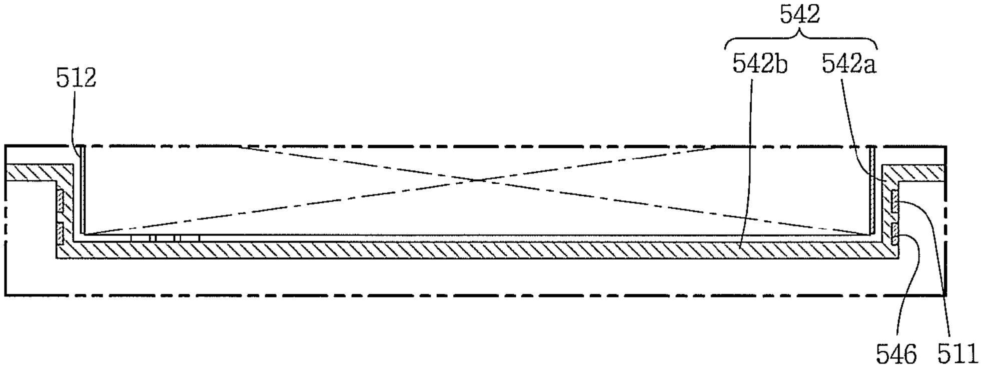

FIGS. 6 to 8 are views showing variants of a battery accommodation portion according to an embodiment of the present invention. Other embodiments and configurations may also be provided. In describing other embodiments, like and/or similar reference numerals may be used for the like or similar elements as those of a former embodiment, and a description thereof may be omitted.

With reference to FIG. 6, a peripheral protrusion 344 may protrude from rear surfaces of a rear case 302 on which an accommodation portion 342 is recessed. The peripheral protrusion 344 may form a loop along edges of the accommodation portion 342. An antenna coil 311 may be wound along the peripheral protrusion 344.

The accommodation portion 342 may include a side wall portion 342*a* and a bottom portion 342*b*.

For example, a battery 341 may be provided such that at least a portion of the battery 341 protrudes more than the rear surface of the rear case 302, in a state in which the battery 341 is provided in the accommodation portion 342. The peripheral protrusion 344 may be sufficiently high to cover a protruded portion of the battery 341. The antenna coil 311 may be combined with a ferrite sheet 312 provided (or mounted) on the battery 341 within the accommodation portion 342 to implement near field communication. The antenna coil 311 may be positioned to be as close as possible to an outside of the mobile terminal. The ferrite sheet 312 may include a first ferrite sheet 312*a* and a second ferrite sheet 312*b*.

FIG. 6 also shows a circuit board 381, a shield member 382, a coupling terminal 343, a front case 301, a battery cover 303 and a connection terminal 341*a*.

FIG. 7 shows an accommodation portion 442 having a bottom portion 442*b* and a side wall portion 442*a*. The bottom portion 442*b* may be configured as a portion of a rear case. A stop protrusion 445 may be formed on an outer circumferential surface of the side wall portion 442*a* such that an antenna coil 411 is caught thereby. The stop protrusion 445 may be provided from the outer circumferential surface of the side wall portion 442*a*. A plurality of stop protrusions may allow a plurality of strands of the antenna coil 411 to be caught thereby, respectively.

When the antenna coil 411 has a form of a wire, the wire may be easily wound and may be caught by the stop protrusion 445. After the wire is wound, the antenna coil 411 may be restrained from moving on the outer circumferential surface of the side wall portion 442*a*.

In the FIG. 7 embodiment, the stop protrusion 445 may protrude from the outer circumferential surface of the side wall portion 442*a*, although embodiments are not necessarily limited thereto. For example, the stop protrusion 445 may be compressed to the outer circumferential surface of the side wall portion 442*a* through heat fusion.

FIG. 7 also shows a ferrite sheet 412 and a battery 441.

FIG. 8 shows an accommodation portion 542 having a side wall portion 542*a* and a bottom wall portion 542*b*. An accommodation recess 546 that accommodates at least a portion of an antenna coil 511 may be formed on an outer circumferential surface of the side wall portion 542*a*. The antenna coil 511 may fill an interior of the accommodation recess 546. The antenna coil 511 may be patterned along the accommodation recess 546 through plating or deposition. FIG. 8 also shows a ferrite sheet 512.

Figure 9:
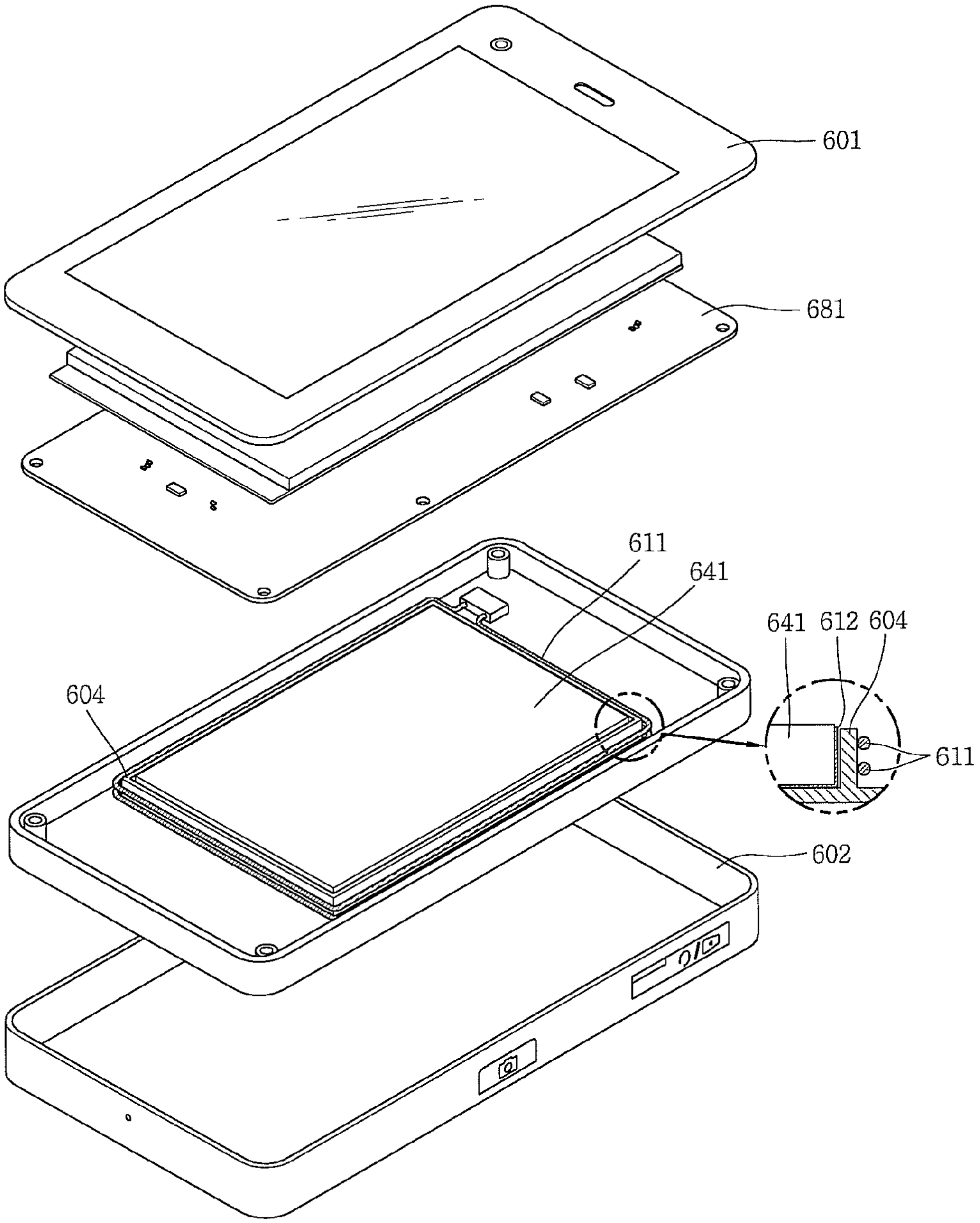
FIG. 9 is an exploded view showing an example of a mobile terminal according to an embodiment of the present invention.

FIG. 9 is an exploded view showing an example of a mobile terminal according to an embodiment of the present invention. Other embodiments and configurations may also be provided.

FIG. 9 shows that a frame structure 604 may be provided (or mounted) within the mobile terminal. The frame structure 604 may be mounted on a front case 601 or a rear case 602, or the frame structure 604 may be integrally formed with the front case 601 or the rear case 602. A battery 641 may be a fixed type battery in at least one embodiment.

FIG. 9 also shows a circuit board 681.

An antenna coil 611 may be wound around the frame structure 604. The battery 641 may be accommodated within the frame structure 604. A ferrite sheet 612 may be formed by coating a metal compound (assuming magnetism) on a structure of the battery 641 (i.e., an external frame of the battery 641) or by inserting the metal compound within the structure. According to the structure, a thickness of the terminal may be reduced.

In the above-described mobile terminal, since the ferrite sheet 612 is formed on the battery 641, an influence of the battery 641 may be minimized (or reduced) to thus enhance performance of near field communication. With such a structure, an area and a space of the ferrite sheet 612 may be maximized (or increased) to form a magnetic field that is strong and evenly distributed.

Additionally, since the antenna coil 611 is wound around an accommodation portion 641 and the ferrite sheet 612 is spaced apart from the antenna coil 611, the mobile terminal may perform near field communication although it has a slimmer design.

A configuration in which the antenna coil 611 is wound along edges of the structure mounted in the main body and the ferrite sheet 612 is disposed on one surface of an electronic element disposed to be adjacent to the structure may be implemented in a different manner. An embodiment implemented in a different manner may be described.

Figure 10:
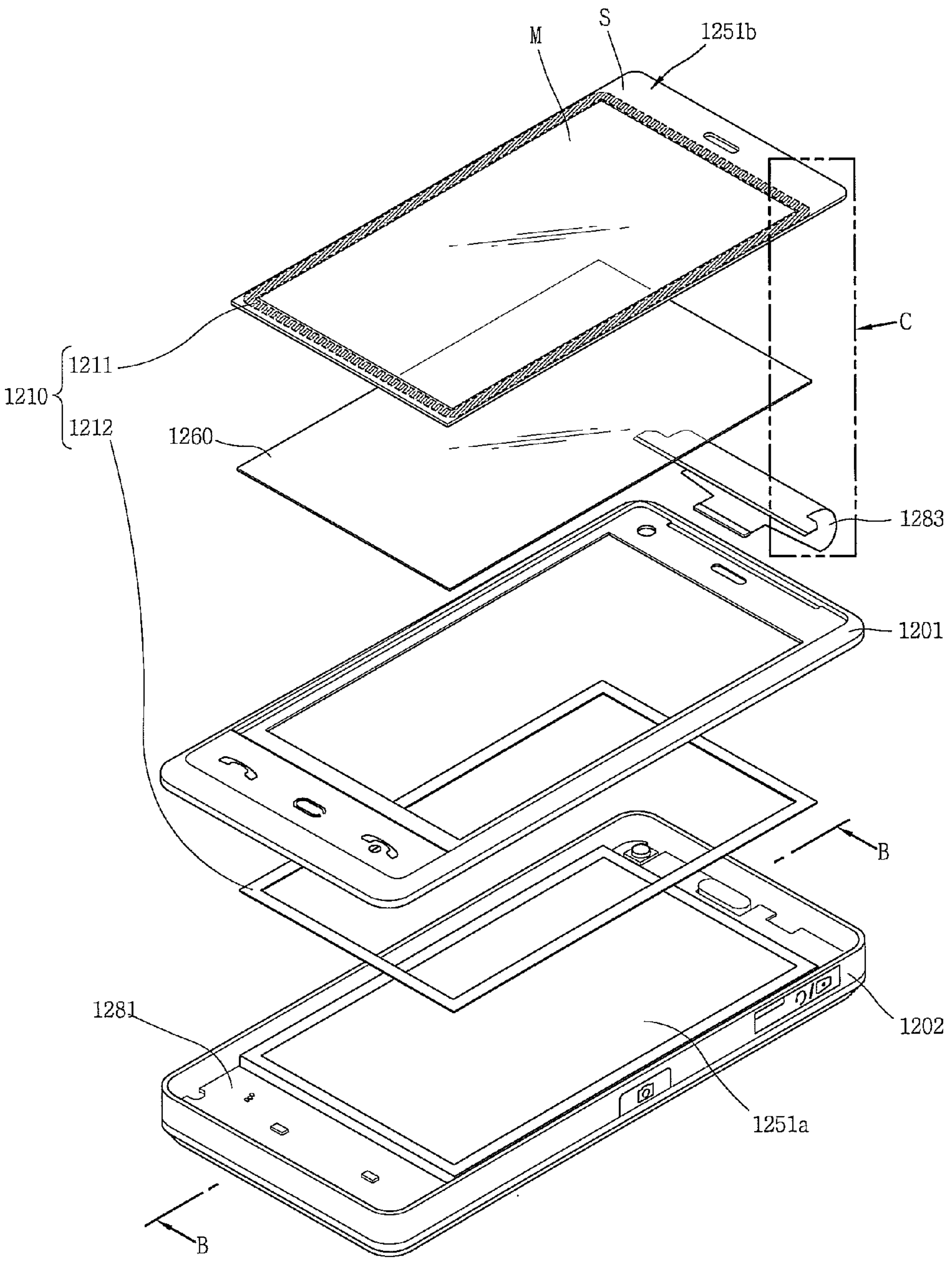
FIG. 10 is an exploded view of a mobile terminal related to an embodiment of the present invention.
Figure 11:
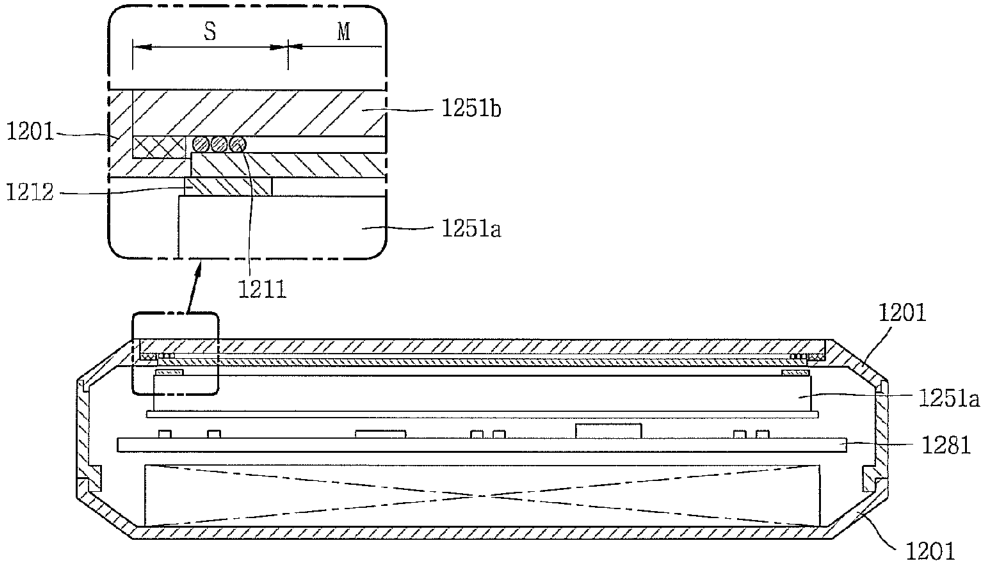
FIG. 11 is a sectional view taken along line B-B in FIG. 10.
Figure 12:
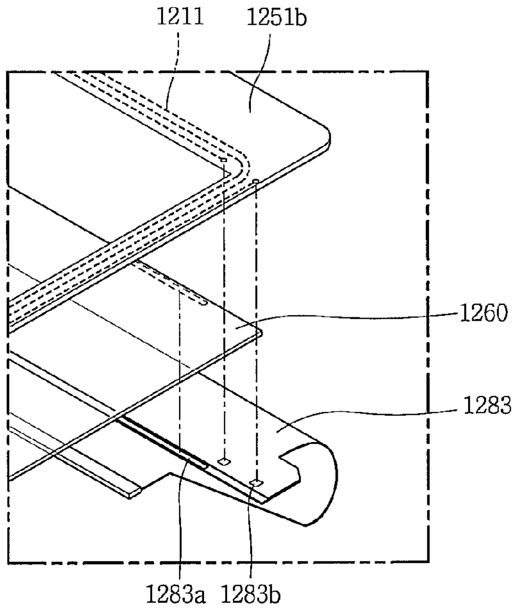
FIG. 12 is an enlarged view of a portion 'C' in FIG. 10.

FIG. 10 is an exploded view of a mobile terminal related to an embodiment of the present invention. FIG. 11 is a sectional view taken along line B-B in FIG. 10. FIG. 12 is an enlarged view of a portion 'C' in FIG. 10. Other embodiments and configurations may also be provided.

With reference to FIG. 10, a window 1251*b* may be coupled to one surface of a front case 1201. The window 1251*b* may be made of a material that allows light to be transmitted therethrough. For example, the window 1251*b* may be made of a light-transmissive synthetic resin, tempered glass, and/or the like. The window 1251*b* may include a portion that does not allow light to be transmitted therethrough. The portion through which light is not transmitted may be implemented by covering the window 1251*b* with a pattern film (not shown). The pattern film may be configured such that a central portion thereof is transparent and edges thereof are opaque. The window 1251*b* may be divided (or separated) into an edge region S that is opaque and a central region M that is surrounded by the edge region S.

A display (or a display element) 1251*a* may be mounted on a rear surface of the window 1251*b*. The display 1251*a* may be arranged to correspond to the window 1251*b* and the display 1251*a* may display visual information to correspond to the central region M.

The portion of the window 1251*b* through which light is transmitted may have an area that corresponds to the display 1251*a*. Accordingly, a user may recognize visual information output to the display 1251*a* from outside. The window 1251*b* and the display 1251*a* may constitute a display unit (i.e., the display unit 251 in FIG. 2A).

A circuit board 1281 may be mounted on a rear case 1202. Alternatively, the circuit board 1281 may be provided (or mounted) on the front case 1201, or the circuit board 1281 may be provided (or mounted) on an internal structure. The circuit board 1281 may be configured as an example of a controller (i.e., the controller 180 in FIG. 1) for operating various functions of the mobile terminal.

A touch sensor 1260 may be provided (or mounted) on the window 1251*b* to sense a touch input. The touch sensor 1260 may be formed to correspond to the window 1251*b*. The touch sensor 1260 may be formed to sense a touched point with respect to the window 1251*b*.

The touch sensor 1260 may be light-transmissive, and the touch sensor 1260 may be configured to convert a change in voltage, capacitance, and/or the like, into an electrical input signal. For example, the touch sensor 1260 may be a capacitive sensor.

An antenna device 1210 to perform short-range communication may be provided within the mobile terminal. The circuit board 1281 may be electrically connected to the antenna device 1210. The circuit board 1281 may process a radio signal that is transmitted and received by the antenna device 1210.

The antenna device 1210 may include an antenna coil 1212 and a ferrite sheet 1212.

As shown in FIGS. 10 and 11, the antenna coil 1211 may be wound along edges of the window 1251*b* to transmit and/or receive a radio signal in relation to near field communication. The antenna coil 1211 may be formed on a rear surface of the window 1251*b* at the edge region S (of the window 1251*b*) to receive a change in magnetic flux generated in a vicinity of the front surface of the mobile terminal. The antenna coil 1211 may be patterned on the rear surface of the window 1251*b* through plating, deposition, fine wiring bonding, and/or the like.

However, embodiments are not necessarily limited thereto. The antenna coil 1211 may be wound on a side of the window 1251*b*.

The antenna coil 1211 may be a portion of an electromagnetic induction type communication system that transmits and receives magnetic flux to and from an antenna of a reader to read information. The antenna coil 1211 may form an antenna of a radio-frequency identification (RFID) tag. However, embodiments are not limited thereto. The antenna coil 1211 may transmit and receive a radio signal to and from a different terminal.

The integrated circuit (IC) of the RFID tag may be provided on the circuit board 1281. In order to electrically connect the integrated circuit and the antenna coil 1211, the antenna coil 1211 may extend to a flexible circuit board 1283. The flexible circuit board 1283 may be connected to the circuit board 1281.

The antenna device 1210 may be a passive type antenna device, a semi-passive type antenna device, and/or an active type antenna device based on power for using RFID. In the passive type antenna device, the mobile terminal may read information of the IC by using a change in magnetic flux at the reader, as energy. In the semi-passive type antenna device, power of the mobile terminal may be used to read information of the IC. In the active type antenna device, power of the mobile terminal may be used to read the information of the IC and transmit and receive the information.

A change in the magnetic flux generated when the antenna coil 1211 comes close to the reader may be interfered by a conductor provided in the mobile terminal body. The conductor may be the display 1251*a*, the touch sensor 1260, a battery, a speaker, a camera, a vibration motor, and/or the like, for example.

The ferrite sheet 1212 may restrain interference to the change in magnetic flux generated by the conductor. The ferrite sheet 1212 may remove noise with respect to a radio signal that is transmitted and received. The ferrite sheet 1212 may be disposed on the display 1251*a* such that the ferrite sheet 1212 is spaded apart from the antenna coil 1211.

The ferrite sheet 1212 may be formed between the touch sensor 1260 and the display 1251*a* to form a buffer. The ferrite sheet 1212 may extend along edges of the display 1251*a* to form a loop such that visual information is displayed on the display 1251*a*. However, embodiments are not necessarily limited thereto. For example, the ferrite sheet 1212 may also be applicable even when the touch sensor is excluded. In this example, the ferrite sheet 1212 may form a buffer between the window 1251*b* and the display 1251*a*.

With reference to FIG. 11, the antenna coil 1211 may be formed on a layer or a substrate different from that of the touch sensor 1260. In order to enhance performance of near field communication when the antenna coil 1211 overlaps with a pattern for touch sensing and a signal transmission line, the ferrite sheet 1212 (or a ferrite form) may be formed on a rear surface of the touch sensor 1260.

The ferrite sheet 1212 may have an annular shape, configured as a buffering damper made of a magnetic material, and the ferrite sheet 1212 may separate the touch sensor 1260 and the display 1251*a*. The ferrite sheet 1212 may have a thickness ranging from about 0.1 millimeter to 0.2 millimeter, for example.

The ferrite sheet 1212 may have a structure in which various metal compounds (assuming magnetism) have a form of paper that can be provided on one surface of the display 1251*a*. Since the antenna coil 1211 is wound around the structure (i.e., the window or the like) of the terminal and the ferrite sheet 1212 is attached to an electronic element (i.e., the display or the like) adjacent thereto, the ferrite sheet 1212 and the antenna coil 1211 (of the antenna device 1210) may be separately configured.

With reference to FIGS. 10 and 12, the flexible circuit board 1283 that is electrically connected to the antenna coil 1211 may form an electrical path that extends from the touch sensor 1260. The flexible circuit board 1283 may be connected to the touch sensor 1260 to transfer a signal based on sensing a touch to the circuit board 1281, and the flexible circuit board 1283 may also be electrically connected to the antenna coil 1211 to allow a signal of near field communication to be processed.

The flexible circuit board 1283 may include a first connection portion 1283*a* that is connected to the touch sensor 1260, and a second connection portion 1283*b* that is formed on a different layer from that of the first connection portion 1283*a* and is connected to the antenna coil 1211. According to such a stacking structure, respective signal paths of the antenna coil 1211 and the touch sensor 1260 at different positions in a thickness direction of the terminal may be implemented by the single flexible circuit board 1283.

FIGS. 13 to 16 are views showing variants of an antenna device according to embodiments. Other embodiments and configurations may also be provided. In describing other embodiments, like or similar reference numerals may be used for the like or similar elements as those of a former embodiment, and a description thereof may be omitted.

Figure 13:
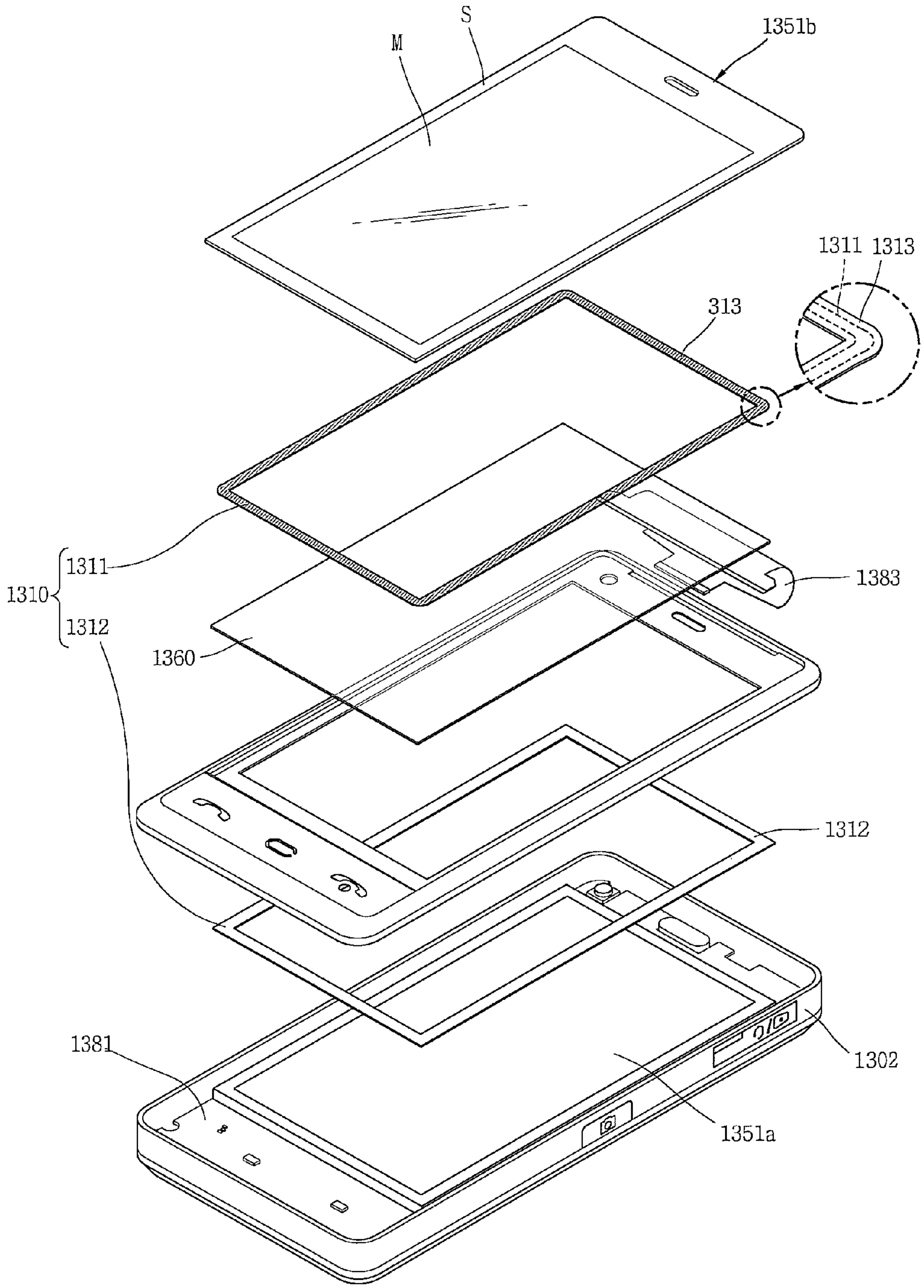
FIGS. 13 to 16 are views showing variants of an antenna device according to embodiments.

FIG. 13 shows an antenna device 1310 having an antenna coil 1311 and a ferrite sheet 1312. The antenna coil 1311 may be provided between a window 1351*b* and a touch sensor 1360.

FIG. 13 also shows a rear case 1302, a display 1351*a*, a circuit board 1381 and a flexible circuit board 1383.

An antenna film 1313 may be provided (or mounted) on a rear surface of the window 1351*b*. The antenna film 1313 may have a structure in which the antenna coil 1311 is formed on a base of a flexible circuit board, for example. In this example, the antenna film 1313 may have an annular shape and may be attached to an edge region S of the window 1351*b*.

In another example, the antenna film 1313 may be formed such that an antenna coil is attached on an optical film. The optical film may have a form having excellent optical performance having high light transmittance, and having a small thickness, for example.

In another example, the antenna film 1313 may be formed such that an antenna coil is formed on a pattern film mounted on the window 1351*b*.

Figure 14:
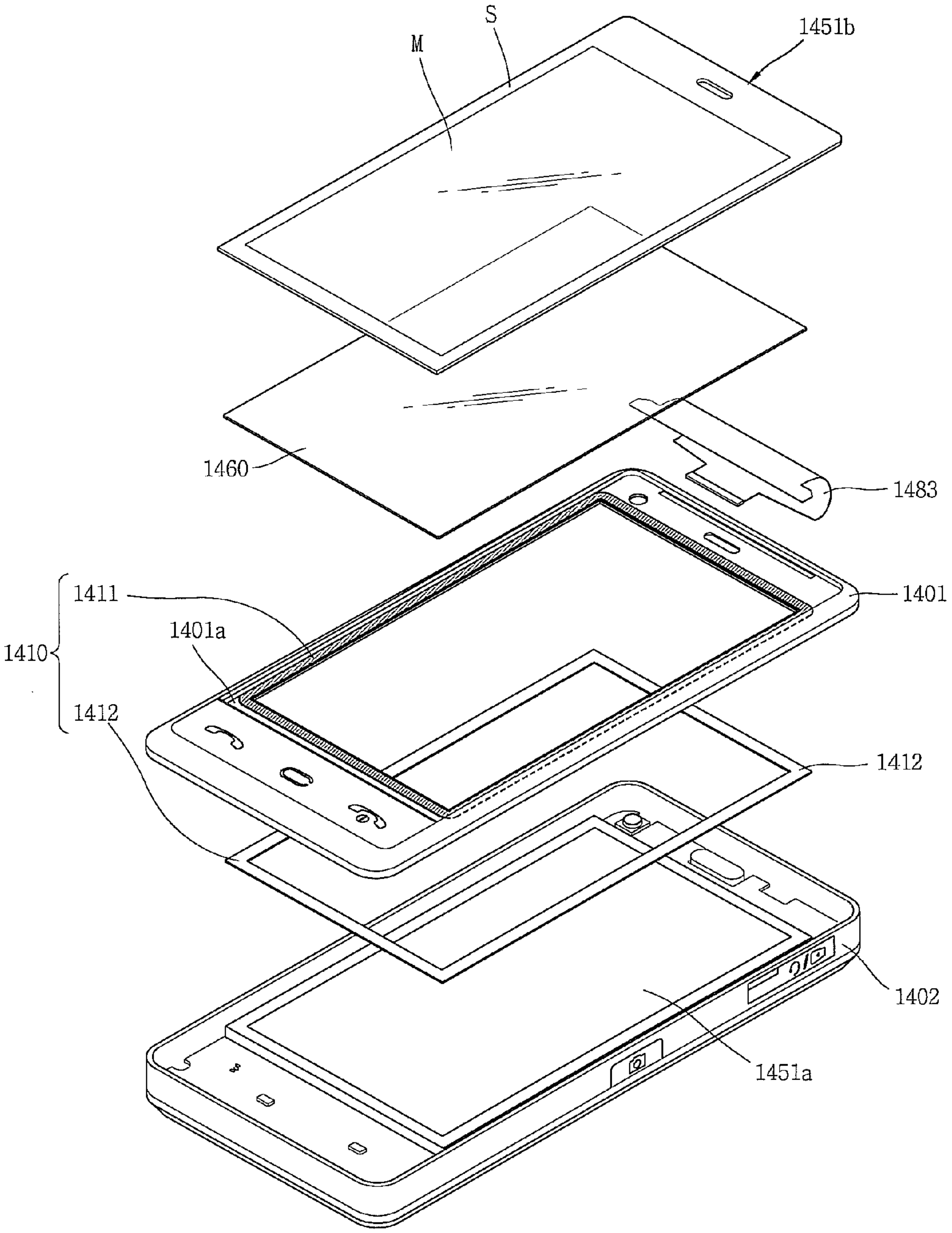

FIG. 14 shows a bezel portion 1401*a* may be formed on a front case 1401. A window 1451*b* may be mounted on the bezel portion 1401*a*. Alternatively, the bezel portion 1401*a* may be provided apart from the front case 1401.

The bezel portion 1401*a* may be formed such that at least a portion of an edge region S is mounted thereon, and an antenna coil 1411 may be disposed on the bezel portion 1401*a*. In order to attach the antenna coil 1411, a fine recess (not shown) may be formed on the bezel portion 1401*a*. A magnetic metal compound may be coated on the bezel portion 1401*a* to allow the bezel portion 1401*a* to serve as a ferrite sheet.

FIG. 14 shows an antenna device 1410 that includes the antenna coil 1411 and the ferrite sheet 1412. FIG. 14 also shows a rear case 1402, a display 1451*a* and a flexible circuit board 1483.

Figure 15:
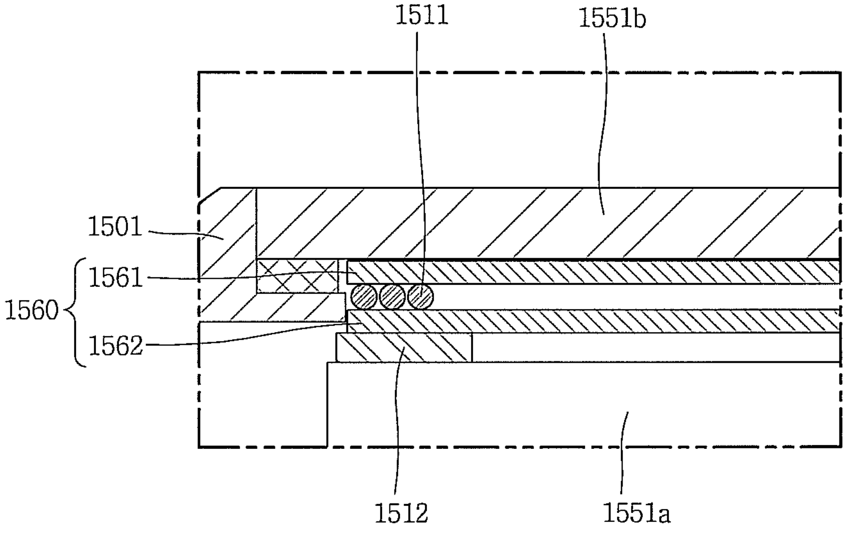

FIG. 15 shows a touch sensor 1560 that includes a first electrode film 1561 and a second electrode film 1562, each having a conductive pattern formed thereon. The first electrode film 1561 and the second electrode film 1562 may be an indium tin oxide (ITO) film or a carbon nano-tube (CNT) film, and/or the like, respectively.

An antenna coil 1511 may be formed on a surface of any one of the electrode films 1561 and 1562. For example, a conductive pattern may be formed on one surface of the first electrode film 1561 to sense a touch, and the antenna coil 1511 may be formed on an opposite surface of the first electrode film 1561. Alternatively, the antenna coil 1511 may be disposed on the opposite surface of a surface on which the conductive pattern is formed. In order to form the antenna coil 1511 on the first or second electrode film 1561 or 1562, plating, deposition, or the like, may be used.

Figure 16:
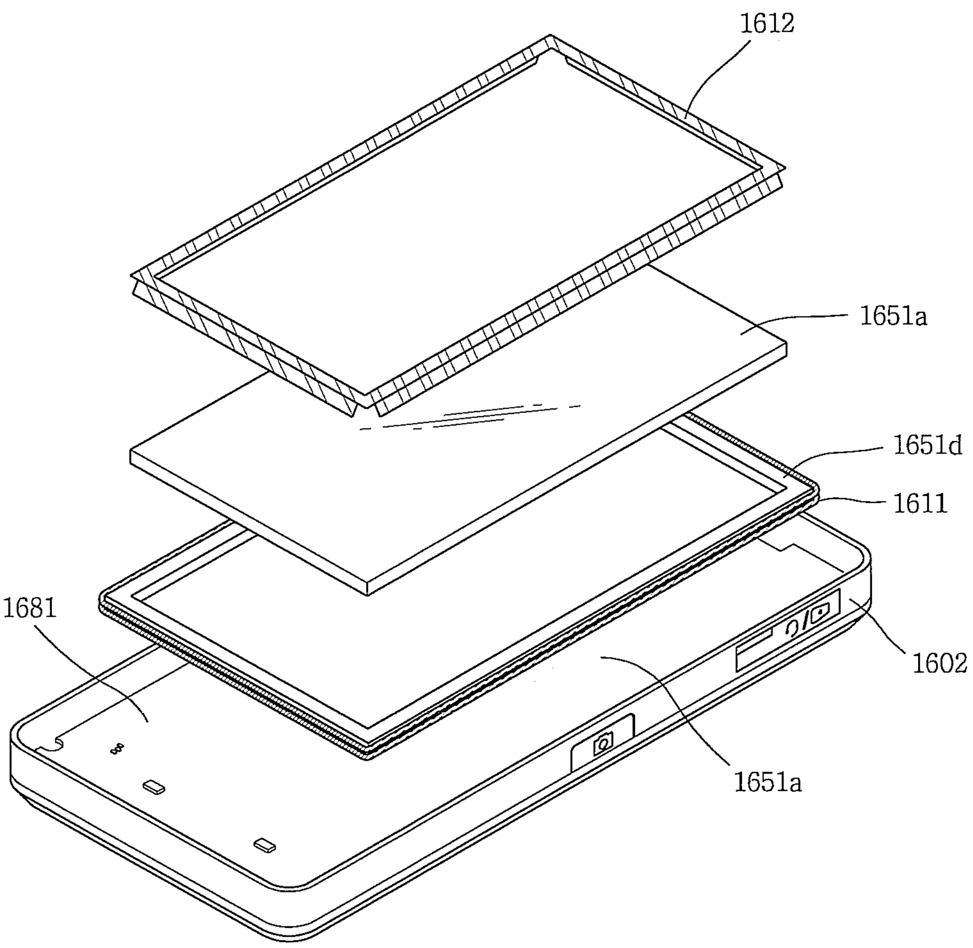

FIG. 16 shows a frame 1651*d* to accommodate a display 1651*a*.

The frame 1651*d* may be formed to cover a rear surface of a display 1651*a*. The frame 1651*d* may protrude from edges to protect the side of the display 1651*a*. A backlight of the display 1651*a* may be disposed on the bottom of the frame 1651*d*.

An antenna coil 1611 may be wound on an outer circumferential surface of the frame 1651*d*. The antenna coil 1611 may have a form of a wire and may be fixedly wound around the frame 1651*d*. A ferrite sheet 1612 may extend up to a lateral surface of the display 1651*a* as well as a front surface of the display 1651*a*. The ferrite sheet 1612 at the lateral surface portion of the display 1651*a* may face the antenna coil 1611 in a width direction of the mobile terminal. According to this structure, a magnetic field that is strong and uniformly distributed may be generated, and an effect of extending a communication distance to a reader may be obtained according to experimentation.

In an embodiment, since an antenna coil is formed along edges of a window, near field communication through a front surface of the mobile terminal may be implemented. Since a ferrite sheet may be formed on one surface of the display, an influence of the display may be minimized, thus enhancing performance of near field communication. This structure may maximize area and space of the ferrite sheet to form a magnetic field that is strong and uniformly distributed.

Additionally, in an embodiment, since the ferrite sheet is disposed between the touch sensor and the display, a slimmer structure in which a buffer is not formed with respect to the display can be implemented. Accordingly, a light leakage of the display can be restrained and influence of the touch sensor can be minimized.

An embodiment of the present invention may provide an antenna device having enhanced performance in relation to near field communication, and a mobile terminal having the same.

An embodiment of the present invention may provide a mobile terminal having a slim design and configured to be available for a near field communication.

A mobile terminal may be provided that includes: a main body in which a structure is mounted; an antenna coil formed to be wound along edges of the structure to receive a change in magnetic flux in a vicinity of the main body; an electronic element disposed to be adjacent to the structure; and a ferrite sheet configured to remove noise with respect to reception of the change in the magnetic flux and disposed on one surface of the electronic element such that a distance is formed between the ferrite sheet and the antenna coil (i.e., the ferrite sheet is spaced apart from the antenna coil).

The mobile terminal may include: a main body in which an accommodation portion is formed to receive a battery; an antenna coil formed to be wound along edges of the accommodation portion to receive a change in magnetic flux in a vicinity of the main body; and a ferrite sheet to restrain interference to the change in the magnetic flux by a conductor installed in the main body and disposed on the battery such that a distance is formed between the ferrite sheet and the antenna coil.

The accommodation portion may include a side wall portion that protrudes in a closed loop form from one surface of the structure mounted on the main body to confine an accommodation space of the accommodation portion and a bottom portion formed in a direction crossing the side wall portion to allow the battery to be mounted thereon.

The antenna coil may be wound around an outer circumferential surface of the side wall portion such that the distance is formed by a thickness of the side wall. A stop protrusion may be formed on the outer circumferential surface of the side wall portion to allow the antenna coil to be caught thereby. An accommodation recess may be formed on the outer circumferential surface of the side wall portion to accommodate at least a portion of the antenna coil.

The battery may have a front surface, a rear surface, and a lateral surface. The ferrite sheet may include a first ferrite sheet mounted on the lateral surface of the battery such that the first ferrite sheet faces the side wall portion.

The ferrite sheet may include a second ferrite sheet mounted on at least one of the front surface and the rear surface of the battery. The first ferrite sheet and the second ferrite sheet may be integrally formed. The second ferrite sheet may become a label of the battery.

A coupling terminal may be electrically connected to a connection terminal of the battery, and the battery may be disposed on the accommodation portion. The ferrite sheet may be formed such that at least a portion thereof faces in a same direction as the rear surface of the main body in a state in which the connection terminal and the coupling terminal are connected.

The ferrite sheet may be formed by coating a metal compound assuming magnetism on a frame of the electronic element or by inserting the metal compound within the frame of the electronic element.

The mobile terminal may also include: a main body in which a window is mounted; a display disposed to correspond to the window; an antenna coil formed to be wound along edges of the window to transmit or receive a radio signal in relation to a near field communication; and a ferrite sheet to remove noise with respect to the radio signal and disposed on one surface of the display such that a distance is formed between the ferrite sheet and the antenna coil.

The mobile terminal may include a touch sensor disposed between the window and the display to sense a touch input. The ferrite sheet may be disposed between the touch sensor and the display to form a buffer.

The ferrite sheet may extend along the edges of the display to form a loop. The touch sensor and the display may be spaced apart by the ferrite sheet.

The touch sensor may include electrode films with a conductive pattern formed thereon. The antenna coil may be formed on a surface of any one of the electrode films.

The antenna coil may be disposed between the window and the touch sensor.

The window may be made of a light-transmissive material, and the window may include an edge region processed to be opaque and a central region that is surrounded by the edge region. The antenna coil may be disposed on the edge region. The window may have a front surface exposed to the outside and a rear surface as an opposite surface of the front surface. The antenna coil may be formed on the rear surface of the window.

The main body may have a bezel portion on which at least a portion of the edge region is mounted. The antenna coil may be disposed on the bezel portion.

The window may include a front surface, a rear surface, and a lateral surface. The antenna coil may be formed to surround the lateral surface of the window. A touch sensor for sensing a touch input may be disposed between the window and the display. A flexible circuit board may extend from the touch sensor. The flexible circuit board may be electrically connected to the antenna coil to allow a radio signal to be processed.

The flexible circuit board may include a first connection portion connected to the touch sensor, and a second connection portion formed on a layer different from that of the first connection portion and connected to the antenna coil.

The display may be accommodated in a frame, and the antenna coil may be formed to be wound around an outer circumferential surface of the frame.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:

a main body having an accommodation portion to receive a battery;

an antenna coil wound along edges of the accommodation portion to receive a change in magnetic flux in a vicinity of the main body; and a ferrite sheet to remove noise with respect to reception of the change in the magnetic flux, and the ferrite sheet is provided on one surface of the battery and is spaced apart from the accommodation portion such that a distance is provided between the ferrite sheet and the antenna coil, wherein the accommodation portion is formed on a rear case in a form of a recess in order to accommodate the battery, and the distance between the ferrite sheet and the antenna coil is provided at least by a thickness of the accommodation portion, wherein the accommodation portion includes:

a side wall portion that protrudes in a closed loop form from one surface of the accommodation portion provided on the main body to define an accommodation space of the accommodation portion, and a bottom portion formed in a direction that crosses the side wall portion to allow the battery to be provided thereon, wherein the antenna coil is wound around an outer circumferential surface of the side wall portion.

2. The mobile terminal of claim 1, wherein a stop protrusion is provided on the outer circumferential surface of the side wall portion to catch the antenna coil.

3. The mobile terminal of claim 1, wherein an accommodation recess is provided on the outer circumferential surface of the side wall portion to accommodate at least a portion of the antenna coil.

4. The mobile terminal of claim 1, wherein the battery has a front surface, a rear surface, and a lateral surface, and the ferrite sheet includes a first ferrite sheet on the lateral surface of the battery such that the first ferrite sheet faces the side wall portion of the accommodation portion.

5. The mobile terminal of claim 4, wherein the ferrite sheet further includes a second ferrite sheet on at least one of the front surface or the rear surface of the battery.

6. The mobile terminal of claim 1, further comprising a coupling terminal to electrically connect to a connection terminal of the battery, and the coupling terminal is provided on the accommodation portion, and the ferrite sheet is provided such that at least a portion of the ferrite sheet faces in a same direction as that of the rear surface of the main body in a state in which the connection terminal and the coupling terminal are electrically connected.

7. A mobile terminal comprising:

a main body having a front case, and a window is coupled to the front case;

a display provided to correspond to the window;

an antenna coil wound along edges of the window to receive a change in magnetic flux in a vicinity of the main body; and a ferrite sheet to remove noise with respect to receiving the change in the magnetic flux, and the ferrite sheet being provided on one surface of the display and being spaced apart from the window such that a distance is formed between the ferrite sheet and the antenna coil, wherein the window is made of a light-transmissive material, and the window is separated into an opaque edge region and a central region that is surrounded by the opaque edge region, and the antenna coil is provided on the opaque edge region of the window, and the antenna coil is formed on a rear surface of the window at the opaque edge region of the window.

8. The mobile terminal of claim 7, further comprising:

a touch sensor between the window and the display to sense a touch input, wherein the ferrite sheet is between the touch sensor and the display to form a buffer.

9. The mobile terminal of claim 8, wherein the ferrite sheet extends along edges of the display to form a loop.

10. The mobile terminal of claim 8, wherein the touch sensor includes electrode films with a conductive pattern formed thereon, and the antenna coil is formed on a surface of one of the electrode films.

11. The mobile terminal of claim 8, wherein the antenna coil is provided between the window and the touch sensor.

12. The mobile terminal of claim 7, wherein the main body has a bezel portion, and at least a portion of the edge region is provided on the bezel portion, and the antenna coil is provided on the bezel portion.

13. The mobile terminal of claim 7, wherein the window includes a front surface, a rear surface, and a lateral surface, and the antenna coil is formed to surround the lateral surface of the window.

14. The mobile terminal of claim 7, further comprising:

a touch sensor for sensing a touch input is disposed between the window and the display, and a flexible circuit board that extends from the touch sensor, and the flexible circuit board is electrically connected to the antenna coil to allow the radio signal to be processed.

15. The mobile terminal of claim 7, wherein the display is provided in a frame, and the antenna coil is formed to be wound around an outer circumferential surface of the frame.

16. The mobile terminal of claim 7, wherein the distance between the ferrite sheet and the antenna coil is provided at least by a thickness of an accommodation portion of the main body.

* * * * *